(12) United States Patent
Ackermann et al.

(10) Patent No.: US 7,478,713 B2
(45) Date of Patent: Jan. 20, 2009

(54) HYDRODYNAMIC CLUTCH DEVICE

(75) Inventors: Jürgen Ackermann, Schweinfurt (DE); Thomas Adelmann, Retzstadt (DE); Christoph Gajda, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 338 days.

(21) Appl. No.: 11/374,719

(22) Filed: Mar. 14, 2006

(65) Prior Publication Data

US 2006/0207853 A1 Sep. 21, 2006

(30) Foreign Application Priority Data

Mar. 15, 2005 (DE) .................. 10 2005 012 241

(51) Int. Cl.
*F16D 33/00* (2006.01)
*F16D 35/00* (2006.01)
*F16D 37/00* (2006.01)

(52) U.S. Cl. .................... 192/3.29; 192/3.33
(58) Field of Classification Search ............... 192/3.29, 192/3.33
See application file for complete search history.

(56) References Cited

U.S. PATENT DOCUMENTS

| | | | | |
|---|---|---|---|---|
| 4,540,076 A | * | 9/1985 | Bopp | 192/3.29 |
| 5,417,315 A | * | 5/1995 | Fukunaga | 192/3.3 |
| 5,575,363 A | | 11/1996 | Dehrmann et al. | |
| 5,667,042 A | * | 9/1997 | Olsen et al. | 192/3.29 |

* cited by examiner

*Primary Examiner*—Tisha D Lewis
(74) *Attorney, Agent, or Firm*—Cohen Pontani Lieberman & Pavane LLP

(57) ABSTRACT

A hydrodynamic clutch device has at least one pump wheel, connected to a drive by way of a clutch housing, and a turbine wheel, connected to a takeoff, to form a hydrodynamic circuit. The device also has a bridging clutch with at least one piston, which can shift between a released position and an engaged position, and at least one friction surface acting between this piston and an adjacent support to connect the drive to the takeoff. When the piston is in the released position, the bridging clutch allows the hydrodynamic circuit to be used to transmit at least most of the torque between the drive and takeoff, whereas, when the piston is in the engaged position, the bridging clutch produces a bypass around the hydrodynamic circuit for the transmission of torque. The barrier clutch cooperates with at least one pressure barrier installed between the hydrodynamic circuit and the pressure space. This separation more-or-less completely prevents the exchange of clutch fluid between the hydrodynamic circuit and the pressure space, regardless of the instantaneous position of the piston between its released position and its engaged position and thus regardless of the shift status of the bridging clutch.

10 Claims, 1 Drawing Sheet

HYDRODYNAMIC CLUTCH DEVICE

BACKGROUND OF THE INVENTION

1. Field of the Invention

The invention pertains to a hydrodynamic clutch device including a pump wheel; a housing connecting the pump wheel to a drive; a turbine wheel connected to a takeoff, and cooperating with the pump wheel to form a hydrodynamic circuit; a bridging clutch having a piston movable between an engaged position, wherein the drive transmits torque to the takeoff via the bridging clutch, and a released position, wherein the drive transmits torque to the takeoff via the hydrodynamic circuit; and a pressure circuit including a first pressure medium line which supplies clutch fluid to the hydrodynamic circuit, and a second pressure medium line which supplies clutch fluid to the pressure space.

2. Description of the Related Art

U.S. Pat. No. 5,575,363 describes a hydrodynamic clutch device designed as a hydrodynamic torque converter. This device comprises a clutch housing, which is brought into connection in the conventional manner for rotation in common with a drive, such as an internal combustion engine, and a pump wheel, which works together with a turbine wheel and a stator to form a hydrodynamic circuit. Whereas the turbine wheel is connected nonrotatably to the takeoff, such as a gearbox input shaft, the stator is mounted by way of a freewheel on a support shaft, which is provided radially between a pump wheel hub and the gearbox input shaft. In addition, the hydrodynamic clutch device has a bridging clutch with a piston, which is connected nonrotatably but with freedom of axial movement to the clutch housing.

The hydrodynamic clutch device is designed as a two-line system, as a result of which the following pressure and flow conditions are produced:

A first pressure-medium line is connected to a first flow route, which has flow channels radially between the pump wheel hub and the support shaft and additional flow channels radially between the support shaft and the gearbox input shaft. This first pressure medium line is formed by flow channels provided in the thrust washers located on both sides of the freewheel of the stator. Clutch fluid is supplied to the hydrodynamic circuit through these channels. When there is a positive pressure in the hydrodynamic circuit, the piston is pushed toward the adjacent housing cover of the clutch housing; friction surfaces then allow the piston to be carried along rotationally by the clutch housing. Conversely, this rotation in common produced by the friction surfaces is released when, through a second pressure-medium line, a pressure space assigned to the piston and located axially between the piston and the housing cover is supplied with a positive pressure versus the hydrodynamic circuit, as a result of which the piston is pushed axially toward the hydrodynamic circuit. The second pressure-medium line is connected to a second flow route, which passes by way of a center bore in the gearbox input shaft. Each of the two flow routes is connected to a fluid reservoir.

The essential principle of a two-line system of this type—but also its essential disadvantage—is the installation of the bridging clutch as a separation point between the hydrodynamic circuit and the pressure space. When the bridging clutch is open, therefore, a connection exists between the hydrodynamic circuit and the pressure space, which allows the pressure to equalize at least in the area of the radial extension of the bridging clutch, whereas, when the bridging clutch is closed, a pressure which can differ considerably from that in the pressure space can easily build up in the hydrodynamic circuit, even in direct proximity to the bridging clutch. Grooving which may be provided in the bridging clutch does nothing to change this situation, because this grooving, measured against the total supply of clutch fluid supplied to the hydrodynamic circuit and the pressure space, never allows more than a very small leakage flow to pass through and is therefore unable to exert any noticeable effect on the pressure conditions in the two pressure spaces.

This situation has disadvantageous effects during operation in push mode, that is, when the takeoff rpm's are higher than the drive rpm's, as soon as the bridging clutch is to be closed for the purpose of taking advantage of the braking action of the drive to reduce or avoid a long period of efficiency-impairing slippage or to prevent an unbraked acceleration of the drive upon a sudden transition from push mode to pull mode. The following unpleasant effect then occurs:

As a result of the filling of the hydrodynamic clutch device with clutch fluid, this fluid pushes its way radially outward under the effect of centrifugal force, and ideally we can assume a pressure of "zero" at the center of rotation of the clutch device. As the distance from the center of rotation increases, however, the pressure values increase monotonically, near-maximum values being reached in the area of the radial extension of the bridging clutch, which is usually located in the radially outer area of the device. The increase in these pressure values during operation in push mode is more pronounced in the hydrodynamic circuit than in the pressure space, because the clutch fluid in the pressure space rotates essentially at the same speed as the clutch housing, whereas in the hydrodynamic circuit it rotates at the higher takeoff-side speed of the turbine wheel. Under consideration of the boundary condition that, when the bridging clutch is open, the pressure conditions within the area of the radial extension of the bridging clutch are equalized between the hydrodynamic circuit and in the pressure space, the difference between the pressure-increase curves on the two sides of the piston have the effect that the course of the pressure increase in the pressure space—starting from the area of the radial extension of the bridging clutch and leading radially inward from there—undergoes less of a pressure drop than the course of the pressure increase on the opposite side of the piston, that is, in the hydrodynamic circuit. The consequence of this is that the pressure in the part of the pressure space radially inside the bridging clutch is higher than that in the hydrodynamic circuit, as a result of which the piston is held stably in the released position. If, under these conditions, an actuating command has been given to close the bridging clutch, a positive pressure must first be built up in the hydrodynamic circuit which significantly exceeds the pressure in the pressure space. There is, therefore, a considerable delay in the closing of the bridging clutch.

As soon as the piston of the bridging clutch starts moving toward its engaged position after the necessary high positive pressure has been built up in the hydrodynamic circuit, the connection between the hydrodynamic circuit and the pressure space becomes smaller and thus acts increasingly as a throttle, which has the effect of lowering the pressure in the pressure space below that present in the hydrodynamic circuit and thus ultimately causes the sign of the axial force acting on the piston to reverse. Although the piston would thus now be able to shift into its engaged position by itself, the high positive pressure built up in the hydrodynamic circuit—which had no effect previously while the piston was not moving—now goes suddenly into effect, exerting a strong axial force which accelerates the engaging movement of the piston, so that the piston travels at a very high velocity over the last part of its engaging stroke and thus enters into working connection with the axially adjacent, drive-side component of the clutch housing, such as, for example, a housing cover, in a very abrupt manner. As a result, the speed difference previously existing between the drive and the takeoff disappears within a very short time. In a vehicle traveling in push mode, this process is felt as an unpleasantly hard torque surge and detracts from the comfort of the vehicle's passengers.

SUMMARY OF THE INVENTION

The invention is based on the task of designing a hydrodynamic clutch device with a bridging clutch in such a way that the bridging clutch can be closed without causing any surge in torque even during operation in push mode.

This task is accomplished by a hydrodynamic clutch device having a pressure barrier installed between the hydrodynamic circuit and the pressure space, wherein the pressure barrier cooperates with the bridging clutch to substantially completely prevent exchange of clutch fluid between the hydrodynamic circuit and the pressure space regardless of the position of the piston. By installing a pressure barrier between the hydrodynamic circuit and the pressure space, it is ensured independently, regardless of the instantaneous position of the piston between its released position and its engaged position and thus regardless of the shift state of the bridging clutch, that there is no possibility for the pressure in the area of the radial extension of the bridging clutch to equalize between the hydrodynamic circuit and the pressure space. It is true that, even with such separation, there will still be pressure-increase curves with an essentially monotonic rise between the center of rotation and the area of the radial extension of the bridging clutch both in the hydrodynamic circuit and in the pressure space, where, because of the higher rpm's of the turbine wheel on the takeoff side, the pressure-increase curve in the hydrodynamic circuit during operation in push mode will show a greater increase in pressure than that in the pressure space on the opposite side of the piston. Because of the pressure barrier between the hydrodynamic circuit and the pressure space, however, these two pressure-increase curves will not undergo any equalization even in the area of the radial extension of the bridging clutch and even when the piston is released. Instead, because the pressure-increase curve rises more quickly in the hydrodynamic circuit as a result of the higher rpm's of the takeoff, e.g., the turbine wheel, the piston is pushed toward the pressure space.

As long as the piston is supposed to remain in its released position, the conventional pressure supply to the pressure space is sufficient to counteract the previously mentioned tendency of the piston to engage. To engage the piston, it is then sufficient merely to adjust the pressure supply so as to "settle" the bridging clutch, that is, briefly to raise the pressure supply both to the hydrodynamic circuit and to the pressure space. Finally, as soon as the hydrodynamic circuit has been connected to the pressure supply, even a very small positive pressure in the hydrodynamic circuit versus the pressure space is sufficient to engage the piston. Torque can be transmitted when the pressure in the hydrodynamic circuit is even only slightly greater than that in the pressure space, and thus the transmission behavior of the bridging clutch can be controlled with great sensitivity, so that in no part of the engaging phase of the piston will there be any fear of an abrupt change in the closing conditions. Instead, the piston arrives gently into engagement with the assigned drive-side component of the clutch housing, such as the housing cover, and there no need to fear a surge of torque. The passengers of a vehicle equipped with this type of clutch device will also enjoy a corresponding increase in driving comfort.

Because even a very small positive pressure in the hydrodynamic circuit is sufficient, even in push mode, to make the piston move into its engaged position, this closing occurs with almost no delay. Thus it is possible to avoid any power-reducing and/or efficiency-impairing operating phases of the hydrodynamic clutch device even during operation in push mode. Of course, because of the fast reaction of the bridging clutch to the closing command, even when there is an immediate transition from push mode to pull mode, the drive will accelerate with almost no delay because of the absence of load on the takeoff side.

The previously described advantageous way in which the inventive clutch device operates will also be present in almost exactly the same way when, to promote a cooling effect on frictional areas of the bridging clutch, the clutch is provided with grooves, through which clutch fluid can flow in the direction of the pressure gradient. The limited effect of this type of grooving on the advantageous operating behavior of the inventive clutch device can be explained by the fact that the grooving must be laid out with precision to guarantee certain pressure conditions both in the hydrodynamic circuit and in the pressure space and also to maintain an equilibrium between the clutch fluid being supplied and that being carried away. To this extent, it is true that the grooving will allow a certain amount of clutch fluid to leak from the hydrodynamic circuit into the pressure space, but, because of the throttling effect of grooving of this type, there will be no perceptible influence on the closing behavior of the bridging clutch during push mode.

According to an especially advantageous embodiment of the pressure barrier according to the invention, this separation is provided with a piston stroke-compensating element, which follows the movement of the piston as it travels between the released position and the engaged position. The path available to the compensating element is preferably adapted essentially to the stroke of the piston, so that the piston stroke-compensating element can arrive in a stable end position and stop there after it has completed its following movement. As a result, it can give the piston the opportunity to build up the force against the bridging clutch required to transmit a sufficiently large amount of torque between the drive and the takeoff. It is therefore especially advantageous to locate the piston stroke-compensating element within the area of the radial extension of the bridging clutch, because in this way a deflection-free flow of force is obtained between the piston, the friction areas possibly located between the piston and the piston stroke-compensating element, and the piston stroke-compensating element itself.

It is especially advantageous for the movement by which the piston stroke-compensating element follows the movement of the piston to be elastic, for which reason the piston stroke-compensating element is actuated on the side facing away from the piston by an axial force storing device, which acts in the direction toward the piston. The axial force storing device will essentially be under the weakest pretension when the piston is in the released position; this pretension will increase as the piston moves toward its engaged position under simultaneous axial compression of the axial force storing device, and when the piston reaches the fully engaged position, the force storing device will have the maximum amount of pretension. In a corresponding manner, the axial force storing device will assist the disengaging movement of the piston and thus have the effect that, even during the releasing movement, any friction areas which may be present between the piston and the piston stroke-compensating element remain in contact with each other, so that the pressure separation between the hydrodynamic circuit and the pressure remains intact without interruption.

In any case, the axial force storing device should, with respect to its operating characteristic and the amount of axial force it exerts, be designed so that it can hold the individual components of the bridging clutch in working connection with each other even when the piston is in its released position. As a result, a pressure connection between the hydrodynamic circuit and the pressure space will be permanently prevented, although it will be impossible for any significant amount of torque to be transmitted between the drive and the takeoff. It is obvious that this pressure separation between the hydrodynamic circuit and the pressure space is also present when the piston is fully engaged, so that there is no need for any further explanation in this respect.

The axial force storing device is preferably located in a spring space of the piston stroke-compensating element and is isolated from the pressure space by an additional seal. As a result, it is impossible for a positive pressure in the pressure space to have any effect inside the spring space. Only in this way is it possible to ensure that the piston stroke-compensating element will follow the movement of the piston elastically during the releasing movement of the piston. The location of the seal radially inside the bridging clutch and thus on the access side of the pressure space is therefore vital to the ability of the axial force storing device to produce an elastic force acting toward the piston which can be calculated and supplied with precision.

Finally, the piston stroke-compensating element has a connection for rotation in common either with the drive or with the takeoff, preferably in this case with the drive, to ensure its ability to transmit torque.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE shows the upper half of a longitudinal section through a hydrodynamic torque converter with a bridging clutch of the two-line design.

DETAILED DESCRIPTION OF THE PRESENTLY PREFERRED EMBODIMENTS

Figure 1:
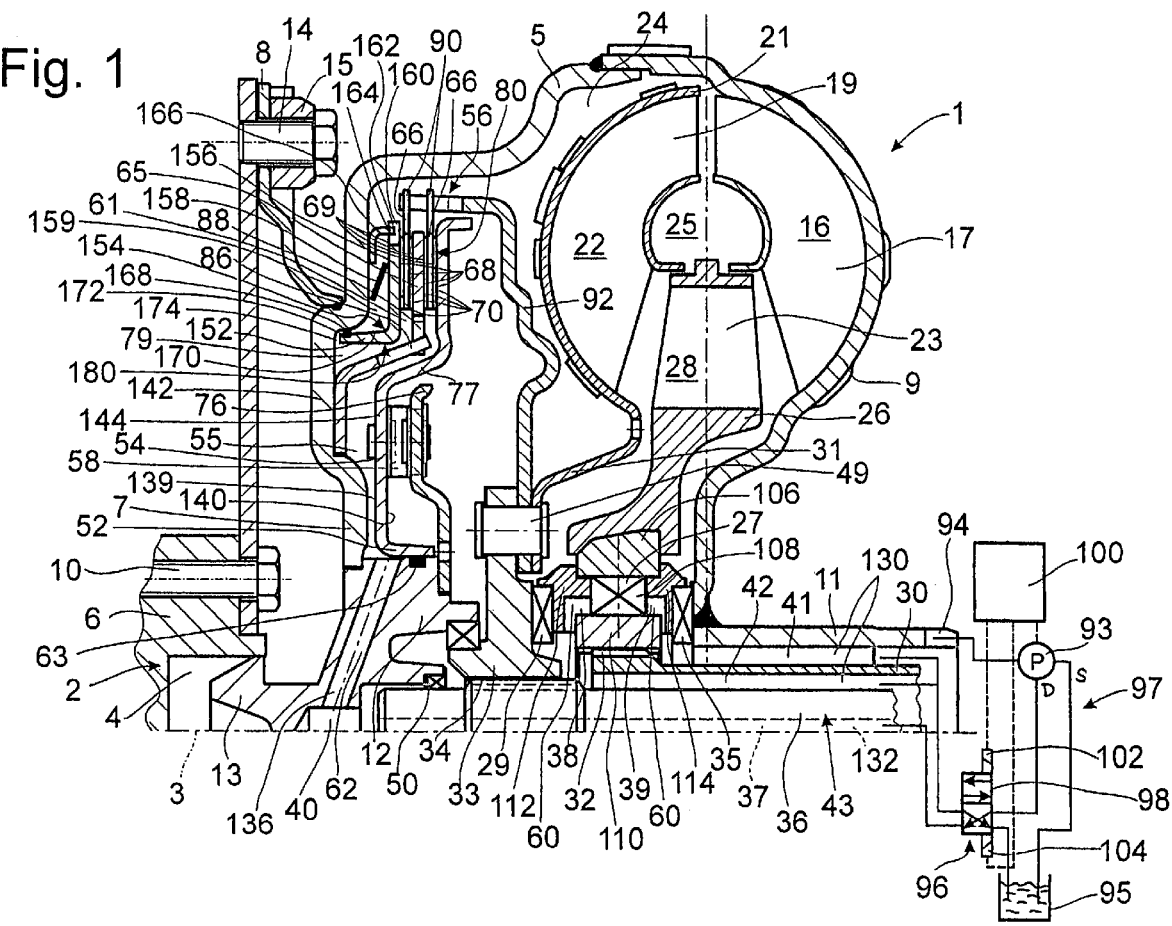

The FIGURE shows a hydrodynamic clutch device 1 in the form of a hydrodynamic torque converter, which is able to execute rotational movement around an axis of rotation 3. The hydrodynamic torque converter has a clutch housing 5 with a housing cover 7 on the side facing a drive 2, such as an internal combustion engine with a crankshaft 6. The housing cover is permanently connected to a pump wheel shell 9. This shell merges in its radially inner area with a pump wheel hub 11.

In its radially inner area, the housing cover 7 has a journal hub 12, which carries a bearing journal 13. The bearing journal 13 is held in a recess 4 in the crankshaft 6 for the purpose of centering the clutch housing 5 on the drive side. The housing cover 7 also has a fastening mount 15, by which the clutch housing 5 is fastened to the crankshaft by way of a flexplate 8, this being accomplished by the use of fastening elements 14, preferably in the form of screws. The flexplate 8 for its own part is fastened to the crankshaft 6 by fastening elements 10, also preferably in the form of screws.

The previously mentioned pump wheel shell 9 works together with pump wheel vanes 16 to form a pump wheel 17. The pump wheel interacts with a turbine wheel 19, which has both a turbine wheel shell 21 and turbine wheel vanes 22, and with a stator 23. The latter has stator vanes 28 on a stator hub 26 and forms, together with the pump wheel 17 and the turbine wheel 19, a hydrodynamic circuit 24, which encloses an internal torus 25.

The stator 23 is mounted by its hub 26 on an outer body 106 of a freewheel 27, which is mounted by way of a rolling element part 108 on an inner body 110. Acting by way of a drive-side thrust washer 112 and a takeoff-side thrust washer 114, the outer body 106 centers the inner body 110 and is itself supported axially on the drive side via the drive-side thrust washer 112, a drive-side axial bearing 29, a turbine wheel hub 33, and a bearing 44 against the journal hub 112, whereas, on the takeoff side, it is supported via the takeoff-side thrust washer 114 and a takeoff-side axial bearing 35 against the pump wheel hub 11.

The stator 23 is connected nonrotatably but with freedom of axial movement to a support shaft 30 by means of a set of teeth 32 on the inner body 110 of its freewheel 27; this support shaft is mounted in such a way that it creates an essentially ring-shaped, radially outer flow channel 41, located radially inside the pump wheel hub 11. The support shaft 30, which is designed as a hollow shaft, encloses in turn a gearbox input shaft 36, which acts as a takeoff 43, thus creating an essentially ring-shaped, radially inner flow channel 42. The gearbox input shaft is provided with a center bore 37 for the passage of clutch fluid. Whereas the two flow channels 41, 42 are provided to serve as the first flow route 130, the center bore 37 serves as a the second flow route 132. The gearbox input shaft 36 has a set of teeth 34 by which it accepts the previously mentioned turbine wheel hub 33 in nonrotatable but axially movable fashion and is sealed off against the journal hub 12 by a seal 50. By means of through-rivets 49, the turbine wheel hub 33 is connected nonrotatably both to a turbine wheel base 31 of the turbine wheel 19 and to an outer plate carrier 92 of a bridging clutch 56.

The previously mentioned flow channels 41, 42 lead via channels 38, 39 in the thrust washers 112, 114, serving as the first pressure-medium line 60, to the hydrodynamic circuit 24. The center bore 37, however, leads to a transition space 40, from which at least one channel 136 proceeds. This channel passes with a radial component through the journal hub 12 and serves as the second pressure line 62. This opens out into a pressure space 55 located axially between the housing cover 7 and a piston 54 of the bridging clutch 56. The housing cover 7 thus serves as the first wall 142 of the pressure space 55, and the side 139 of the piston facing the pressure space 55 serves as the second wall 144 of the pressure space 55. The side of the piston 54 facing away from the pressure space 55 borders the hydrodynamic circuit 24.

In its radially inner area, the piston 54 can be attached by rivets (not shown) and an intermediate axial spring 58 in the form of a set of tangential leaf springs to an anti-twist device 76, which is fastened to the journal hub 12 of the clutch housing 5.

The outer radial end 79 of the area over which the pressure space 55 extends radially is bounded by an axial shank 152 of an essentially ring-shaped, axially displaceable piston stroke-compensating element 154, which surrounds the axis of rotation 3 in an essentially ring-like manner. This compensating element also has a radial shank 156 essentially perpendicular to the axial shank 152. The side of the radial shank facing the housing cover 7 is in contact with an axial force storing device 158, which is supported on the other side against the housing cover 7. In addition, the radial shank 156 of the piston stroke-compensating element 154 is designed with a set of teeth 160 on its radially outer end, by means of which it engages in a set of teeth 164 of an essentially angle-shaped torque-transmitting bracket 166 to form a connection for rotation in common 162 with the housing cover 7, the bracket 166 being fastened for its own part to the housing cover 7 by means of a weld, for example.

The axial shank 152 of the piston stroke-compensating element 154 located radially inside the torque-transmitting bracket 166 has a seal 168 at the end axially facing the housing cover 7, this seal being located radially between the radially outer surface 170 and a cooperating, shaped section 172 of the housing cover 7 extending essentially in the axial direction. As a result of this seal 168, the spring space 159 of the piston stroke-compensating element 154 holding the axial force storing device 158 is sealed off from the pressure space 55.

On the side facing the friction clutch 56, the radial shank 156 of the piston stroke-compensating element 154 has a friction surface 69, which interacts with a friction lining 68 on a plate 66, designed as an outer plate, which, on the side facing away from the piston stroke-compensating element 154, has a second friction lining 68, which interacts with another friction surface 69 on a facing plate 65, designed as an inner plate. Whereas a friction surface 69 on the other axial side of the inner plate 65 interacts with a first friction lining 68 on a plate 66 designed as a second outer plate, the second friction lining 68 of the latter plate 66 interacts with a friction surface 69 on the adjacent side of the piston 54 of the bridging clutch 56.

Depending on whether the first pressure-medium line 60 or the second pressure-medium line 62 is actuated and thus depending on the pressure relationships in the hydrodynamic circuit 24 and in the pressure space 55, the piston can be moved in the axial direction between two different limit positions, which will be discussed in greater detail below. The piston 54 can be shifted axially by means of its base 52, which is supported on the journal hub 12, where a piston seal 63 recessed into the journal hub 12 seals off the gap between the base 52 and the hub.

An inner plate carrier 86, which is connected nonrotatably by a set of teeth 88 to the radially inner plate 65, is mounted axially between the housing cover 7 and the piston 54. The plate carrier 86 is located in the radially central area of the piston 64 and is fastened to the housing cover 7. The two radially outer plates 66, however are attached nonrotatably to the outer plate carrier 92 by sets of teeth 90.

In FIG. 1, the piston 54 is in its released position. In this position, the piston 54 is at its maximum axial distance from the housing cover 7. The axial force storing device 158 of the piston stroke-compensating element 154 is pushing the compensating element toward the piston 54, so that an axial gap 174 remains between the axial shank 152 of the piston stroke-compensating element 154 and the housing cover 7; the axial dimension of this gap is essentially equal to the stroke of the piston 54 in the axial direction. In this position, the side of the radial shank 156 of the piston stroke-compensating element 154 facing the piston 54 axially actuates the adjacent friction lining 68 of the adjacent radially outer plate 66 and pushes this toward the piston 54. As a result, the radially inner plate 65 and the second radially outer plate 66 are simultaneously actuated in the direction toward the piston 54. Even in the released position of the piston 54, therefore, all of the friction linings 68 of the bridging clutch 56 are in working connection with their assigned friction surfaces 69. Because of the relatively weak axial force exerted by the piston stroke-compensating element 154, however, the plates 65, 66 are able to transmit only a negligible amount of torque, not the torques which would normally be supplied by the drive 2. As a result of the working connection between the friction linings 68 and the friction surfaces 69, even in the released position of the piston 54, there is at least an essentially fluid-tight and pressure-tight separation between the hydrodynamic circuit 24 and the pressure space 55. The piston stroke-compensating element 154 thus forms, together with the plates 65, 66 and the friction surface 69 on the piston 54, a pressure barrier 180. Any grooves 70 which may be provided in the friction linings 68 to cool the friction linings 68 do not exert any significant influence on the function of the pressure barrier 180, because these grooves 70 act as throttle points 80 and thus allow only a negligible amount of fluid to flow through under the effect of the pressure difference. No further discussion of these grooves is therefore required.

The piston 54 shifts from its released position toward the housing cover 7 and thus into its engaged position when a positive pressure acts on the side of the piston 54 facing the turbine wheel 19, that is, when the pressure in the hydrodynamic circuit 24 is higher than that in the pressure space 55. During this engaging movement, the piston 54 pushes the plates 65, 66, which are able to shift axially with respect to their plate carriers 86, 92, increasingly toward the housing cover 7 to bring about an axial compression of the axial force storing device 158 of the piston stroke-compensating element 154 and thus an axial displacement of the latter toward the housing cover 7. During this axial displacement, the axial dimension of the axial gap 174 between the housing cover 7 and the axial shank 152 decreases more and more, until the axial shank 152 of the piston stroke-compensating element 154 has ultimately come to rest against the housing cover 7 and thus supports the element against the housing cover 7. Because the piston stroke-compensating element 154 is no longer able to move in the axial direction, any further engaging movement of the piston will lead to a dramatic increase in the pressures per unit area between the friction linings 68 of the plates 66 and the friction surfaces 69 on the plate 65, on the housing cover 7, and on the piston 54. Thus a working connection between the various elements of the bridging clutch 56 is produced, which makes it possible for the even the high torques supplied by the drive 2 to be transmitted via the bridging clutch 56. There is at least essentially no pressure or fluid connection between the hydrodynamic circuit 24 and the pressure space 55 in the engaged position either.

To release the piston 54, that is, to return it to the starting position, pressure is built up in the pressure space 55 until it is higher than that in the hydrodynamic circuit 24. As a result, a positive pressure acts on the side of the piston 54 which faces the housing cover 7. Because a seal 168 is located radially within the connecting points between friction linings 68 and the friction linings 69, the pressure prevailing in the pressure space 55 cannot act in the spring space 159 holding the axial force storing device 158 either. This is important, because, to ensure that the pressures being applied between the friction linings 68 and the associated friction surfaces 69 are decreased rapidly during the releasing movement, the pressure in the pressure space 55 acting on the piston 54 should be higher than the pressure in the hydrodynamic circuit 24. At the same time, however, the friction linings 68 and the friction surfaces 69 are to be kept in working connection with the piston 54 only by the axial force generated by the axial force storing device, not by the much higher pressure prevailing in the pressure space 55. The point of this is to avoid unnecessary energy losses and to prevent problematic friction-induced heating of the friction linings 68 and of the friction areas 69 during the course of the release movement.

The piston stroke-compensating element 154 is therefore connected to the plates 65, 66 and to the friction surface 69 on the piston 54 in both positions of the piston 54, that is, in both the engaged position and in the released position, and thus acts as a pressure barrier 180 between the hydrodynamic circuit 24 and the pressure space 55.

The piston 54 of the bridging clutch 56 is engaged and released as follows:

The previously mentioned flow channels 41, 42, the former located radially between the pump wheel hub 11 and the support shaft 30, the latter between the support shaft and the gearbox input shaft 36, supply the hydrodynamic circuit 24 with clutch fluid via the first pressure-medium lines 60 and the channels 38, 39 in the thrust washers 112, 114, whereas the center bore 37 in the gearbox input shaft 36 supplies the pressure space 55 with clutch fluid via the transition space 40 and the second pressure-medium lines 62. To guarantee the correct supply in each case, a pressure circuit 97, sketched in FIG. 1, is required. This circuit comprises a pressure source 93, driven in the conventional manner by a drive cam 94 on the pump wheel hub 11, whereas its suction side S can be connected to a fluid reservoir 95 and its delivery side D either to the flow channels 41, 42 or to the center bore 37. The clutch fluid is supplied to the flow channels 41, 42 or to the center bore 37 in accordance with the commands transmitted by an open-loop or closed-loop control unit 100, which is referred to in brief as the controller 100, and which is in working connection both with a switching device 96 in the form of a switching valve 98 installed in the pressure circuit 97 and with the pressure source 93. Preferably the switching valve 98 is designed as a 4/2-port directional control valve, actuated by electromagnets 102, 104, which actuate the switching device 96 in accordance with the commands transmitted by the controller 100.

To deflect the piston 54 from the released position shown in FIG. 1 and thus to engage the piston 54, the switching device 96 is actuated by the electromagnet 102 driven by the controller 100 in such a way that the magnet pushes the switching valve 88 from the position shown in FIG. 1 to a second position, in which the delivery side D of the pressure source 93 is connected to the flow channels 41, 42. The pressure in the channels therefore increases, whereas it decreases simultaneously in the center bore 37 of the gearbox input shaft 36, which is now connected via the switching valve 98 to the fluid reservoir 95.

The clutch fluid which has entered the flow channels 41, 42 arrives via the first pressure-medium line 60 in the hydrodynamic circuit 24, and, assisted by the rotation of the clutch housing 5 around the axis of rotation 3, this fluid is displaced radially outward, where the pressure barrier 180 prevents it from passing through to the pressure space 55, at least to any significant degree. The clutch fluid acts on the piston 54, pushing it toward the pressure space 55, which empties simultaneously via the second pressure-medium line 62. As a result of the positive pressure quickly building up in the hydrodynamic circuit 24 versus the pressure space 55, the takeoff-side piston wall 140 of the piston 54 is subjected to pressure, as a result of which the desired displacement of the piston 54 toward the housing cover begins very quickly. Even a slight positive pressure in the hydrodynamic circuit 24 is sufficient to initiate the movement of the piston 54. Under this slight positive pressure, the piston 54 pushes the plates 65, 66 relatively slowly toward the friction surface 69 on the housing cover 7, so that the torque-transmitting connection is established between the drive 2 and the takeoff 43 without any torque surges.

These conditions which are present during the engagement of the piston 54 are also present in principle during operation in push mode. Nevertheless, because of the higher takeoff rpm's at the turbine wheel 19, the pressure in the hydrodynamic circuit 24 is higher than it is during operation in pull mode, whereas the pressure in the pressure space 55 is lower, at least in relation to the hydrodynamic circuit 24. In a hydrodynamic clutch device 1 of the inventive design, therefore, push-mode operation supports the engagement of the piston 54.

So that the piston 54 can be returned to its released position, the switching device 96 is actuated by the electromagnet under the command of the controller 100 in such a way that the electromagnet 104 moves the switching valve 88 into the position shown in FIG. 1, in which the delivery side D of the pressure source 93 is connected to the center bore 37 of the gearbox input shaft 36. Thus the pressure increases there, whereas it decreases simultaneously in the flow channels 41, 42, which are now connected to the fluid reservoir 95 by the switching valve 98.

Because of this pressure and connection situation, clutch fluid is conducted from the fluid reservoir 95 via the center bore 37 of the gearbox input shaft 36 and the second pressure-medium line 62, into the pressure space 55. Supported by the rotation of the clutch housing 5 around the axis of rotation 3, the clutch fluid does proceed radially outward, but because of the pressure barrier 180, it cannot pass through into the hydrodynamic circuit 24, at least to any significant degree. The pressure in the pressure space 55, which is now higher than that in the hydrodynamic circuit 24, pushes the piston against the action of the hydrodynamic circuit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
  a pump wheel;
  a housing connecting the pump wheel to a drive;
  a turbine wheel connected to a takeoff, the turbine wheel being located in the housing and cooperating with the pump wheel to form a hydrodynamic circuit;
  a bridging clutch located in the housing and comprising a piston located between the hydrodynamic circuit and a pressure space, said piston being movable between an engaged position, wherein the drive transmits torque to the takeoff via the bridging clutch, and a released position, wherein the drive transmits torque to the takeoff via the hydrodynamic circuit;

a pressure circuit comprising a first pressure medium line which supplies clutch fluid to the hydrodynamic circuit, and a second pressure medium line which supplies clutch fluid to the pressure space;

a pressure barrier installed between the hydrodynamic circuit and the pressure space, said pressure barrier cooperating with said bridging clutch to substantially completely prevent exchange of clutch fluid between the hydrodynamic circuit and the pressure space regardless of the position of the piston;

a pump wheel hub connected to the pump wheel;

a pressure source connected to a fluid reservoir;

at least one first flow route provided radially between the pump wheel hub and the takeoff, the first flow route connecting the pressure source to the first pressure medium line; and a second flow route in the takeoff, the second flow route connecting the pressure source to the second pressure medium line.

2. A hydrodynamic clutch device comprising:

a pump wheel;

a housing connecting the pump wheel to a drive;

a turbine wheel connected to a takeoff, the turbine wheel being located in the housing and cooperating with the pump wheel to form a hydrodynamic circuit;

a bridging clutch located in the housing and comprising a piston located between the hydrodynamic circuit and a pressure space, said piston being movable between an engaged position, wherein the drive transmits torque to the takeoff via the bridging clutch, and a released position, wherein the drive transmits torque to the takeoff via the hydrodynamic circuit;

a pressure circuit comprising a first pressure medium line which supplies clutch fluid to the hydrodynamic circuit, and a second pressure medium line which supplies clutch fluid to the pressure space; and a pressure barrier installed between the hydrodynamic circuit and the pressure space, said pressure barrier cooperating with said bridging clutch to substantially completely prevent exchange of clutch fluid between the hydrodynamic circuit and the pressure space regardless of the position of the piston, wherein the pressure barrier comprises a piston stroke compensating element which follows the piston as the piston moves between the released position and the engaged position.

3. The hydrodynamic clutch device of claim 2 further comprising an axial force storing device which loads the piston stroke compensating element axially toward the bridging clutch.

4. The hydrodynamic clutch device of claim 3 wherein the axial force storing device is supported against the housing.

5. The hydrodynamic clutch device of claim 4 wherein the piston stroke compensating element is provided with a spring space, the axial force storing device being located in the spring space.

6. The hydrodynamic clutch device of claim 5 further comprising a seal located between the piston stroke compensating element and the housing.

7. The hydrodynamic clutch device of claim 6 wherein the seal is located radially inside the bridging clutch.

8. A hydrodynamic clutch device comprising:

a pump wheel;

a housing connecting the pump wheel to a drive;

a turbine wheel connected to a takeoff, the turbine wheel being located in the housing and cooperating with the pump wheel to form a hydrodynamic circuit;

a bridging clutch located in the housing and comprising a piston located between the hydrodynamic circuit and a pressure space, said piston being movable between an engaged position, wherein the drive transmits torque to the takeoff via the bridging clutch, and a released position, wherein the drive transmits torque to the takeoff via the hydrodynamic circuit;

a pressure circuit comprising a first pressure medium line which supplies clutch fluid to the hydrodynamic circuit, and a second pressure medium line which supplies clutch fluid to the pressure space;

a pressure barrier installed between the hydrodynamic circuit and the pressure space, said pressure barrier cooperating with said bridging clutch to substantially completely prevent exchange of clutch fluid between the hydrodynamic circuit and the pressure space regardless of the position of the piston; and wherein a piston stroke compensating element is connected for rotation in common with, and freedom of axial movement with respect to, one of said drive and said takeoff.

9. A hydrodynamic clutch device comprising:

a pump wheel;

a housing connecting the pump wheel to a drive;

a turbine wheel connected to a takeoff, the turbine wheel being located in the housing and cooperating with the pump wheel to form a hydrodynamic circuit;

a bridging clutch located in the housing and comprising a piston located between the hydrodynamic circuit and a pressure space, said piston being movable between an engaged position, wherein the drive transmits torque to the takeoff via the bridging clutch, and a released position, wherein the drive transmits torque to the takeoff via the hydrodynamic circuit;

a pressure circuit comprising a first pressure medium line which supplies clutch fluid to the hydrodynamic circuit, and a second pressure medium line which supplies clutch fluid to the pressure space; and a pressure barrier installed between the hydrodynamic circuit and the pressure space, said pressure barrier cooperating with said bridging clutch to substantially completely prevent exchange of clutch fluid between the hydrodynamic circuit and the pressure space regardless of the position of the piston; and a torque transmitting bracket fixed to said housing, a piston stroke compensating element engaging the bracket for rotation in common with said housing.

10. The hydrodynamic clutch device of claim 3 wherein the piston stroke compensating element wherein the bridging clutch comprises at least two plates, the piston stroke compensating element having a side facing away from the axial force storing device and in working connection with one of said plates, at least one additional plate supporting said one of said plates against said piston.

* * * * *